(12) United States Patent
Motwani et al.

(10) Patent No.: US 9,250,990 B2
(45) Date of Patent: Feb. 2, 2016

(54) USE OF ERROR CORRECTION POINTERS TO HANDLE ERRORS IN MEMORY

(71) Applicant: INTEL CORPORATION, Santa Clara, CA (US)

(72) Inventors: Ravi H. Motwani, San Diego, CA (US); Kiran Pangal, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 14/129,070

(22) PCT Filed: Sep. 24, 2013

(86) PCT No.: PCT/US2013/061455
§ 371 (c)(1),
(2) Date: Dec. 23, 2013

(87) PCT Pub. No.: WO2015/047228
PCT Pub. Date: Apr. 2, 2015

(65) Prior Publication Data
US 2015/0089310 A1    Mar. 26, 2015

(51) Int. Cl.
*G06F 11/07*    (2006.01)
*G06F 11/10*    (2006.01)

(52) U.S. Cl.
CPC ............ *G06F 11/073* (2013.01); *G06F 11/076* (2013.01); *G06F 11/1048* (2013.01)

(58) Field of Classification Search
CPC ............ G06F 11/1008; G06F 11/1052; G06F 11/1056; G06F 11/073; G06F 11/076; G06F 11/10; H03M 13/6343; H03M 13/19; H03M 13/15; G11C 2029/0411; G11C 29/42; G11C 29/44

USPC .................................................. 714/758, 764
See application file for complete search history.

(56) References Cited

U.S. PATENT DOCUMENTS

| | | | | |
|---|---|---|---|---|
| 5,588,010 | A | * | 12/1996 | Hardell et al. ................. 714/757 |
| 5,751,733 | A | * | 5/1998 | Glover .......................... 714/765 |
| 6,560,725 | B1 | | 5/2003 | Longwell et al. |
| 7,328,365 | B2 | * | 2/2008 | Karpuszka et al. ............ 714/6.2 |
| 7,386,771 | B2 | * | 6/2008 | Shuma .......................... 714/718 |

(Continued)

OTHER PUBLICATIONS

International Search Report and Written Opinion mailed Jun. 20, 2014, for International Application No. PCT/US2013/061455, 10 pages.

(Continued)

*Primary Examiner* — James C Kerveros
(74) *Attorney, Agent, or Firm* — Schwabe, Williamson & Wyatt, P.C.

(57) ABSTRACT

Methods, apparatuses, and systems related to use of error correction pointers (ECPs) to handle hard errors in memory are described herein. In embodiments, a read module of a memory controller may read a codeword stored in a memory. The read module may determine a number of hard errors in the codeword. Responsive to a determination that the number of hard errors exceeds a threshold, the read module may store ECP information associated with the hard errors. The read module may include an error correction code (ECC) module to perform an ECC process on the codeword. The read module may use the ECP information to decode the codeword to recover the data responsive to a determination that the ECC process failed. Other embodiments may be described and claimed.

24 Claims, 3 Drawing Sheets

(56) References Cited

U.S. PATENT DOCUMENTS

| | | |
|---|---|---|
| 7,392,440 B2 * | 6/2008 | Ouchi et al. .................. 714/709 |
| 7,702,989 B2 * | 4/2010 | Graef et al. ................... 714/780 |
| 8,140,945 B2 * | 3/2012 | Cypher ......................... 714/785 |
| 2007/0234112 A1 | 10/2007 | Thayer et al. |
| 2009/0292968 A1 | 11/2009 | Cypher |
| 2010/0257428 A1 | 10/2010 | Murin |
| 2011/0296258 A1 * | 12/2011 | Schechter et al. ............ 714/704 |
| 2014/0258805 A1 * | 9/2014 | Casado et al. ................ 714/758 |

OTHER PUBLICATIONS

Qureshi, Moinuddin, "Pay-As-You-Go Low-Overhead Hard-Error Correction for Phase Change Memories", Micro '2011, Porto Alegre Brazil, Dec. 3-7, 2011, 11 pages.

Xinmiao, Zhang, Fang, Cai, and Anantram, M.P, "Low-Energy and Low-Latency Error-Correction for Phase Change Memory", Circuits and Systems (ISCAS), 2013 IEEE International Symposium, May 19-23, 2013, 16 pages.

* cited by examiner

USE OF ERROR CORRECTION POINTERS TO HANDLE ERRORS IN MEMORY

CROSS REFERENCE TO RELATED APPLICATION

The present application is a national phase entry under 35 U.S.C. §371 of International Application No. PCT/US2013/061455, filed Sep. 24, 2013, entitled "USE OF ERROR CORRECTION POINTERS TO HANDLE ERRORS IN MEMORY," which designates, among the various States, the United States of America, and the entire contents and disclosures of which are hereby incorporated by reference in their entireties.

FIELD

Embodiments of the present invention relate generally to the technical field of memory. Specific embodiments relate to a memory controller.

BACKGROUND

Memory errors can be classified as hard errors, which persist from read to read (e.g., stuck bits), or soft errors which randomly occur. For example, in cross-point memories, if the threshold voltage or resistance of a memory cell is higher than the selection voltage, then the cell may become stuck on a logical value (e.g., 0 or 1). Hard errors can be a significant portion of the errors in cross-point memories.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smartphone (which may include one or more processors), a tablet, laptop computer, a set-top box, a gaming console, and so forth.

Figure 1:
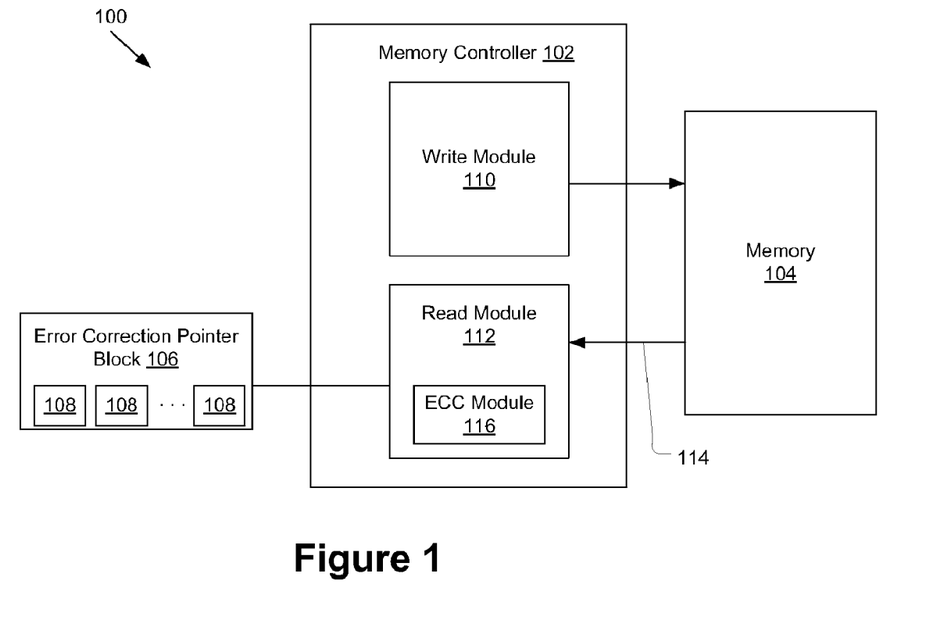
FIG. 1 illustrates an example memory system in accordance with various embodiments.

FIG. 1 illustrates a memory system 100 in accordance with various embodiments. The memory system 100 may include a memory controller 102, a memory 104, and an error correction pointer (ECP) block 106. The memory 104 may implement various forms of volatile or non-volatile memory, including, but not limited to, NAND (flash) memory, ferroelectric random-access memory (FeTRAM), nanowire-based non-volatile memory, three-dimensional (3D) crosspoint memory such as phase change memory (PCM), memory that incorporates memristor technology, magnetoresistive random-access memory (MRAM), Spin Transfer Torque (STT)-MRAM, etc. The ECP block 106 may be used together with an error correction code (ECC) to correct both hard and soft errors detected in data stored in memory 104. The ECP block 106 may include a plurality of ECPs 108. In other embodiments, the ECP block 106 may be included in the memory 104. In still other embodiments, the ECP block 106 may be included in memory controller 102.

The memory controller 102 may control writing data into the memory 104 and/or reading data from the memory 104. For example, the memory controller 102 may include a write module 110 for writing data into the memory 104 and a read module 112 for reading data from the memory 104. The memory controller 102 may interface with one or more other components (e.g., a processor) to allow the one or more other components to write data into the memory 104 and/or read data from the memory 104.

In embodiments, the memory controller 102 may be included in a same package with the memory 104.

In various embodiments, the data stored in the memory 104 may be arranged in a plurality of codewords. The read module 112 may be coupled to the memory 104 via a bus 114 having a plurality of bus lines. The read module 112 may further include an ECC module 116 to perform an ECC process on the data read from the memory 104.

In embodiments, memory controller 102 may be incorporated with the teaching of the present disclosure to use ECP 106 to handle hard errors encountered from reading data from memory 104, to be described more fully below.

Figure 2:
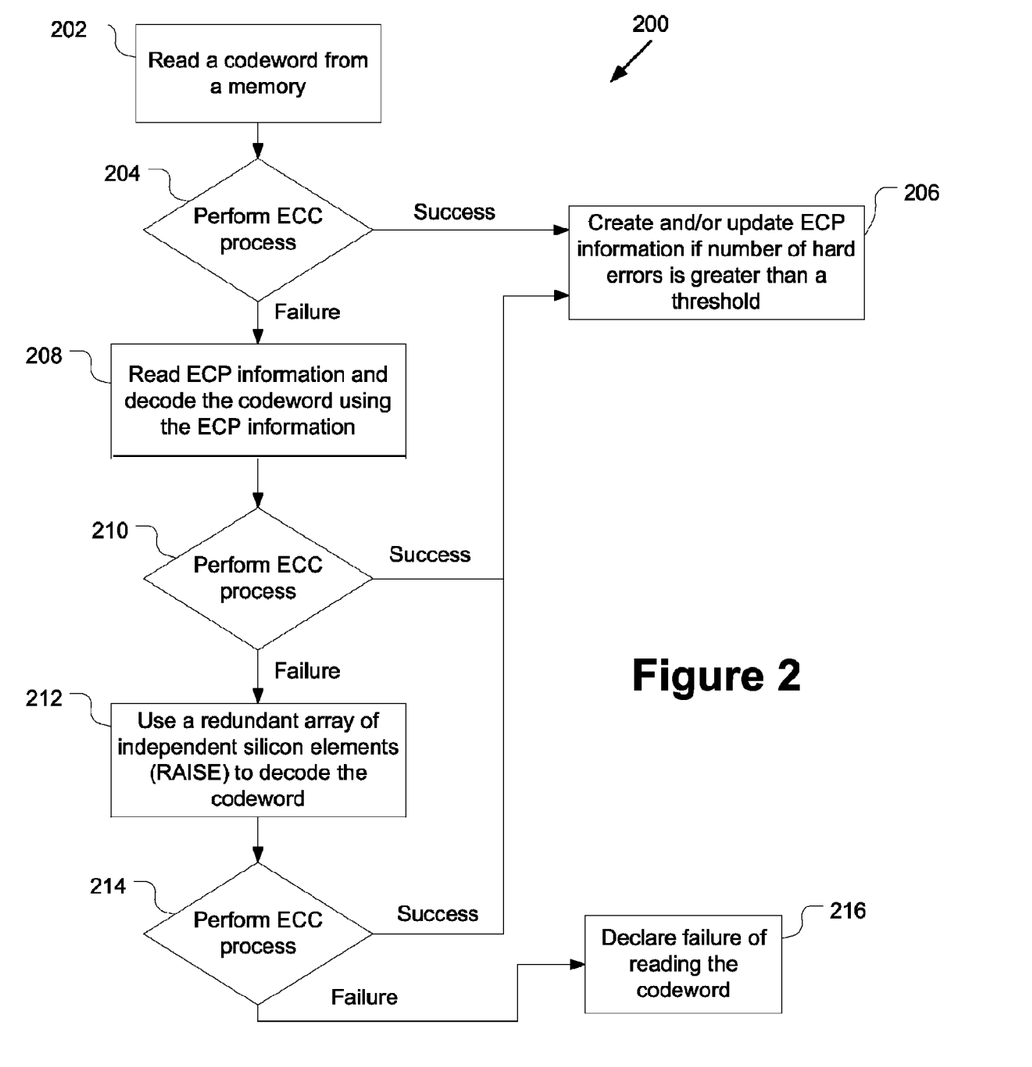
FIG. 2 illustrates a read process for reading data from a memory in accordance with various embodiments.

FIG. 2 illustrates a read process 200 that may be performed by the memory controller 102 in accordance with various embodiments.

At block 202 of the process 200, the read module 112 of the memory controller 102 may attempt to read a codeword stored in the memory 104 (e.g., via the bus 114). The codeword may include a series of data bits, e.g., 8, 16, 32, or 64 bits, with each bit being either a logic 0 or a logic 1. At block 204 of the process 200, the ECC module 116 of the memory controller 102 may perform an ECC process on the codeword to decode and recover the data. The memory controller 102 may generate an ECC associated with the codeword when writing the codeword to the memory 104. In some embodiments, the ECC may be stored in the memory 104. In the ECC process performed by the ECC module 116, the ECC module 116 may use the ECC generated by the memory controller 102 to determine if the codeword read from the memory 104 is the same as the codeword that was written to the memory 104. If the codeword read from the memory 104 includes one or more errors (e.g., hard and/or soft errors), the ECC module 116 may use the ECC associated with the codeword to identify and correct the errors to recover the codeword.

If the ECC process at block 204 is successful (e.g., the codeword is accurately recovered as validated by the ECC), then, at block 206 of the process 200, the read module 112 may determine a number of hard errors in the codeword. For example, the read module 112 may log a history of errors associated with memory cells of the memory 104. If a same memory cell has an error (e.g., a same type of error, such as storing a logic 1 rather than a logic 0) for k consecutive times (where k is a positive integer), then that memory cell is flagged as having a hard error.

In various embodiments, the read module 112 may compare the number of hard errors to a threshold. Responsive to a determination that the number of hard errors in the codeword exceeds the threshold, the read module 108 may create and/or update ECP information associated with the hard errors. The read module 108 may store the ECP information in respective ECPs 108. The ECP information may, for example, include an identifier of the codeword (e.g., a logical block address (LBA) identifying where the codeword is stored in the memory 104), and may indicate the bits of the codeword that include hard errors and indicate the correct value of those bits. In some embodiments, the ECPs 108 may be arranged in a binary tree in the ECP block 106. The binary tree may allow the read module 112 to scan the ECP block 106 and quickly find the ECP information for the desired codeword (e.g., based on the LBA).

In some embodiments, the threshold may be less than a number of hard errors that are correctable by the ECC process. For example, in some embodiments, the threshold may be t-m, where t is the number of hard errors that are correctable by the ECC process, and m is a positive integer (e.g., 2). In some embodiments, the value of m may be programmable (e.g., via firmware).

In some embodiments, the threshold may be greater than 1. Thus, the ECP information may not be stored for all hard errors in the memory 104, thereby reducing ECP overhead. In some embodiments, the ECPs 108 may be dynamically assigned to codewords stored in the memory 104 as needed.

If, however, the ECC process at block 204 fails, then, at block 208 of the process 200, the read module 112 may determine if ECP information exists for the codeword (e.g., as created during a prior operation of block 206). If ECP information exists, the read module 112 may use the ECP information to decode and recover the codeword. For example, the bits of the codeword with hard errors may be replaced with the correct bits as provided by the ECP information. The ECP information may indicate the bits of the codeword that include hard errors and indicate the correct value of those bits.

As discussed above, the read module 112 may use the ECP information to decode and recover the codeword responsive to a determination that the ECC process at block 204 failed. If the ECC process at block 204 is successful, the ECP information may not be used. Accordingly, the process 200 may provide reduced latency compared with a read process that uses ECPs for all data and/or codewords read from memory.

Additionally, or alternatively, the ECPs 108 may allow the use of a lower strength ECC code (e.g., BCH code). The lower strength ECC code may reduce the memory overhead designated for ECC. Since the ECP information may only be stored if the number of hard errors in the codeword exceeds the threshold, the overhead required for the ECP block 106 may be lower than the overhead required for ECG to correct the same amount of errors.

At block 210 of the process 200, the ECC module 116 may perform an ECC process on the codeword decoded using the ECP information (e.g., at block 208). The ECC process at block 210 may be similar to the ECC process performed at block 204 described above. If the ECC process at block 210 is successful (e.g., the codeword is accurately recovered as validated by the ECC), then, at block 206, the read module 112 may determine a number of hard errors in the codeword and update and/or create the ECP information for the codeword, as described above.

In some embodiments, if the ECC process at block 210 fails, then the process 200 may further include block 212. At block 212, the read module 112 may use a redundant array of independent silicon elements (RAISE) to decode the codeword. When RAISE is invoked, the codeword may be stored across multiple independent die of the memory 104. At block 214 of process 200, the ECC module 116 may perform an ECC process on the data decoded using the RAISE.

If the ECC process at block 214 is successful, the process 200 may perform the operation of block 206, as described above. However, if the ECC process at block 214 fails, then the read module 112 may declare, at block 216, a failure of reading the codeword (e.g., an uncorrectable bit error rate (UBER) event).

As discussed above, the read module 112 may compare the number of hard errors in the codeword to a first threshold, and create and/or update ECP information for the codeword if the number of hard errors exceeds the first threshold. In some embodiments, the read module 112 may further compare the number of hard errors in the codeword to a second threshold that is higher than the first threshold. If the number of hard errors in the codeword exceeds the second threshold, the read module 112 may retire the memory cells of the memory 104 that are associated with the codeword from further use. In some embodiments, the second threshold may be equal to or greater than the number of errors that are correctable using the ECC process, so that all data readings from the memory cells associated with the codeword are likely to fail the ECC process.

In some embodiments, the read module 112 may determine that the memory 104 has a bus failure or higher level failure based on ECP information associated with a plurality of codewords of the memory 104. For example, the read module 112 may analyze the ECP information for a plurality of codewords, and may determine that a bus line of bus 114 has failed if a number of codewords having hard errors on bits associated with the bus line exceeds a threshold.

In some embodiments, the memory controller 102 may create, update and/or use the ECP information during a background data refresh (BDR) process for the memory 104. In the BDR process, a codeword may be read from the memory 104 and rewritten to the memory 104 to preserve the codeword. Creating, updating and/or using the ECP information during the BDR process may prepare the memory controller for handling errors during a read operation for a host device.

Figure 3:
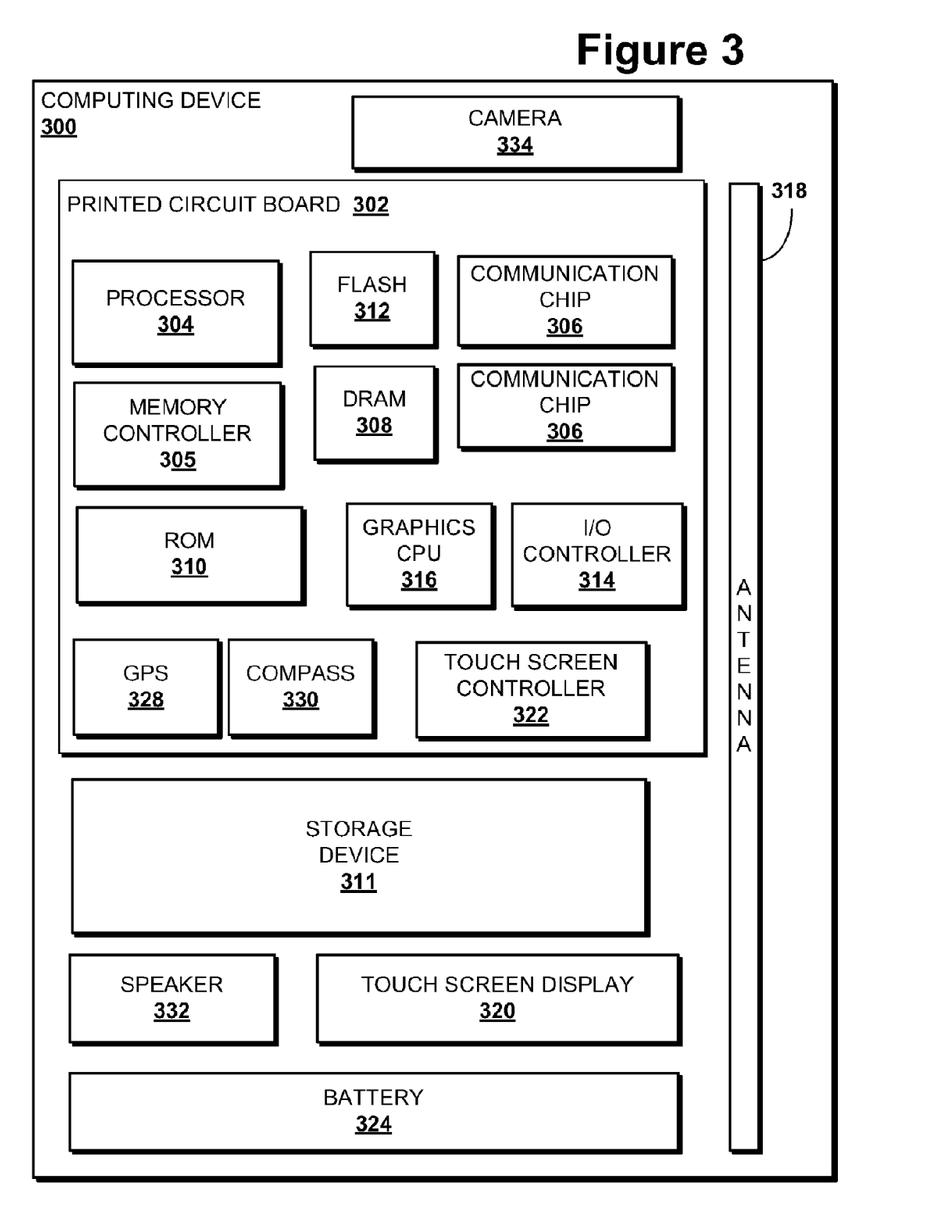
FIG. 3 illustrates an example system configured to employ the apparatuses and methods described herein, in accordance with various embodiments.

FIG. 3 illustrates an example computing device 300 which may employ the apparatuses and/or methods described herein (e.g., memory controller 102, memory 104, ECP block 106, and/or read process 200), in accordance with various embodiments. As shown, computing device 300 may include a number of components, such as one or more processor(s) 304 (one shown) and at least one communication chip 306. In various embodiments, the one or more processor(s) 304 each may include one or more processor cores. In various embodiments, the at least one communication chip 306 may be physically and electrically coupled to the one or more processor(s) 304. In further implementations, the communication chip 306 may be part of the one or more processor(s) 304. In various embodiments, computing device 300 may include printed circuit board (PCB) 302. For these embodiments, the one or more processor(s) 304 and communication chip 306 may be disposed thereon. In alternate embodiments, the various components may be coupled without the employment of PCB 302.

Depending on its applications, computing device 300 may include other components that may or may not be physically and electrically coupled to the PCB 302. These other components include, but are not limited to, memory controller 305, volatile memory (e.g., DRAM 308), non-volatile memory such as read only memory 310 (ROM) and storage device 311 (e.g., a hard disk drive (HDD)), an I/O controller 314, a digital signal processor (not shown), a crypto processor (not shown), a graphics processor 316, one or more antenna 318, a display (not shown), a touch screen display 320, a touch screen controller 322, a battery 324, an audio codec (not shown), a video codec (not shown), a global positioning system (GPS) device 328, a compass 330, an accelerometer (not shown), a gyroscope (not shown), a speaker 332, a camera 334, and a mass storage device (such as hard disk drive, a solid state drive, compact disk (CD), digital versatile disk (DVD)) (not shown), and so forth. In various embodiments, the processor 304 may be integrated on the same die with other components to form a System on Chip (SoC).

In various embodiments, rather than or in addition to storage device 312, computing device 300 may include resident non-volatile memory, e.g., flash memory 312. In some embodiments, the one or more processor(s) 304 and/or flash 312 may include associated firmware (not shown) storing programming instructions configured to enable memory controller 305, in response to execution of the programming instructions by memory controller 305, to practice all or selected aspects of the methods described herein (e.g., method 200). In other words, memory controller 305 may be memory controller 102 described herein. In various embodiments, these aspects may additionally or alternatively be implemented using hardware components, such as programmable logic devices.

The DRAM 308, flash memory 312, and/or storage device 311 may include the memory 104 described herein. The memory controller 305 may also be used to read data from, or write data to, the DRAM 308, flash memory 312, and/or storage device 311.

In some embodiments, memory controller 305 may be included in a memory controller hub (MCH) of the computing device 300. The memory controller 305 may additionally or alternatively be included in one or more other components of the computing device 300, e.g., one or more of processors 304, DRAM 308, flash memory 312, and/or storage device 311. In some embodiments, the memory controller 305 may be packaged with one or more of processors 304 to form a system on chip (SoC).

The communication chips 306 may enable wired and/or wireless communications for the transfer of data to and from the computing device 300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 306 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. The computing device 300 may include a plurality of communication chips 306. For instance, a first communication chip 306 may be dedicated to shorter range wireless communications such as Wi-Fi and Bluetooth and a second communication chip 306 may be dedicated to longer range wireless communications such as GPS, EDGE, GPRS, CDMA, WiMAX, LTE, Ev-DO, and others.

In various implementations, the computing device 300 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 300 may be any other electronic device that processes data.

Some non-limiting examples are provided below.

Example 1 is an apparatus for reading data from a memory, the apparatus comprising a read module configured to: determine if a number of hard errors in a codeword read from memory exceeds a threshold; and responsive to a determination that the number of hard errors in the codeword exceeds the threshold, store error correction pointer (ECP) information associated with hard errors of the codeword in one or more ECPs.

Example 2 is the apparatus of Example 1, wherein the read module includes an error correction code (ECC) module to perform an ECC process on the codeword, and wherein the read module is further configured to use the ECP information to decode the codeword responsive to a determination that the ECC process failed.

Example 3 is the apparatus of Example 2, wherein the threshold is less than a number of hard errors that are correctable by the FCC process.

Example 4 is the apparatus of Example 2, wherein the ECC process is a first FCC process, and wherein the FCC module is further configured to perform a second ECC process on the codeword using the ECP information.

Example 5 is the apparatus of Example 4, wherein the read module is configured to use a redundant array of independent silicon elements (RAISE) to decode the codeword if the second ECC process fails.

Example 6 is the apparatus of any one of Examples 1 to 5, wherein the threshold is a first threshold, and wherein the read module is further configured to: determine that the number of hard errors in the codeword exceeds a second threshold that is higher than the first threshold; and responsive to the determination that the number of hard errors exceeds the second threshold, retire memory cells of the memory associated with the codeword from further use.

Example 7 is the apparatus of any one of Examples 1 to 5, wherein the read module is further configured to determine that the memory has a bus failure based on ECP information associated with a plurality of codewords stored in the memory.

Example 8 is the apparatus of Example 1, wherein the memory is a phase change memory.

Example 9 is the apparatus of Example 1, wherein the memory is a cross-point memory.

Example 10 is the apparatus of Example 1, wherein the read module is included in a memory controller of the apparatus.

Example 11 is a method for reading data from a memory comprising reading data from a codeword stored in a memory; performing an error correction code (ECC) process on the codeword; determining that the ECC process failed to successfully decode the codeword to recover the data; responsive to the determination that the ECC process failed, reading error correction pointer (ECP) information associated with the codeword from one or more ECPs; and decoding the codeword to recover the data based on the ECP information.

Example 12 is the method of Example 11, further comprising: determining a number of hard errors in the codeword; determining that the number of hard errors in the codeword exceeds a threshold; and responsive to the determination that the number of hard errors in the codeword exceeds the threshold, updating the ECP information associated with the codeword.

Example 13 is the method of Example 12, wherein the threshold is less than a number of hard errors that are correctable by the ECC process.

Example 14 is the method of Example 12, wherein the threshold is a first threshold, and wherein the method further comprises: determining that the number of hard errors in the codeword exceeds a second threshold that is higher than the first threshold; and retiring memory cells of the memory associated with the codeword from further use responsive to the determination that the number of hard errors exceeds the second threshold.

Example 15 is the method of Example 11, further comprising analyzing ECP information associated with a plurality of codewords of the memory to determine that the memory has a bus failure.

Example 16 is the method of any one of Examples 11 to 15, wherein the ECC process is a first ECC process, and wherein the method further comprises: performing a second ECC process on the codeword based on the ECP information; determining that the second FCC process failed; and performing a redundant array of independent silicon elements (RAISE) to decode the codeword to recover the data responsive to the determination that the second ECC process failed.

Example 17 is a system for reading data from a memory, the system comprising: a memory to store a plurality of codewords including a first codeword; and a read module coupled to the memory. The read module is configured to: read the first codeword from the memory; determine that the first codeword was successfully decoded; determine a number of hard errors in the first codeword responsive to the determination that the first codeword was successfully decoded; determine that the number of hard errors in the first codeword exceeds a threshold; and responsive to the determination that the number of hard errors in the first codeword exceeds the threshold, store error correction pointer (ECP) information associated with hard errors of the first codeword in one or more ECPs.

Example 18 is the system of Example 17, wherein the read module includes an error correction code (ECC) module to perform an ECC process on the first codeword, and wherein the read module is further configured to use the ECP information to decode the first codeword to recover the data responsive to a determination that the ECC process failed.

Example 19 is the system of Example 18, wherein the threshold is less than a number of hard errors that are correctable by the ECC process.

Example 20 is the system of Example 18, wherein the ECC process is a first ECC process, wherein the ECC module is further configured to perform a second ECC process on the first codeword decoded using the ECP information, and wherein the read module is further configured to use a redundant array of independent silicon elements (RAISE) to decode the first codeword responsive to a determination that the second ECC process failed.

Example 21 is the system of Example 17, wherein the threshold is a first threshold, and wherein the read module is further configured to: determine that the number of hard errors in the first codeword exceeds a second threshold that is higher than the first threshold; and responsive to the determination that the number of hard errors exceeds the second threshold, retire memory cells of the memory associated with the first codeword from further use.

Example 22 is the system of Example 17, wherein the read module is further configured to determine that the memory has a bus failure based on ECP information associated with the plurality of codewords of the memory.

Example 23 is the system of any one of Examples 17 to 22, wherein the memory is a phase change memory.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for reading data from a memory, the apparatus comprising:
   an error correction pointer (ECP) block to store a plurality of ECP pointers including ECP information associated with hard errors of one or more codewords associated with data stored in a memory; and
   a memory controller including a read module coupled with the ECP block to read data stored in the memory, wherein to read data stored in the memory includes:
      determine whether a number of hard errors in a codeword read from the memory exceeds a threshold; and responsive to a determination that the number of hard errors in the codeword exceeds the threshold, update the ECP information associated with the hard errors of the codeword in one or more of the ECPs.

2. The apparatus of claim 1, wherein the read module includes an error correction code (ECC) module to perform an ECC process on the codeword, and wherein the read module is further to use the ECP information associated with hard errors of the codeword to decode the codeword responsive to a determination that the ECC process failed.

3. The apparatus of claim 2, wherein the threshold is less than a number of hard errors that are correctable by the ECC process.

4. The apparatus of claim 2, wherein the ECC process is a first ECC process, and wherein the ECC module is further to perform a second ECC process on the codeword using the ECP information.

5. The apparatus of claim 4, wherein the read module is configured to use a redundant array of independent silicon elements (RAISE) to decode the codeword if the second ECC process fails.

6. The apparatus of claim 1, wherein the threshold is a first threshold, and wherein the read module is to further:
   determine that the number of hard errors in the codeword exceeds a second threshold that is higher than the first threshold; and
   responsive to the determination that the number of hard errors exceeds the second threshold, retire memory cells of the memory associated with the codeword from further use.

7. The apparatus of claim 1, wherein the read module is to further determine that the memory has a bus failure based on ECP information associated with a plurality of codewords stored in the memory.

8. The apparatus of claim 1, wherein the memory is a phase change memory or a cross-point memory.

9. The apparatus of claim 1, wherein the ECP block is included in the memory controller.

10. The apparatus of claim 1, wherein the ECP information include an identifier of the codeword identifying where the codeword is stored in the memory, or indicating bits of the codeword that include hard errors and correct values of those bits, and wherein the ECPs is arranged in a binary tree in the ECP block.

11. A method for reading data from a memory comprising:
   reading, by a read module of a memory controller apparatus, data from a codeword stored in a memory;
   performing, by the read module, an error correction code (ECC) process on the codeword;
   determining, by the read module, that the ECC process failed to successfully decode the codeword to recover the data;
   responsive to the determination that the ECC process failed, reading, by the read module, error correction pointer (ECP) information associated with the codeword from one or more ECPs stored in an ECP block of the apparatus; and
   decoding, by the read module, the codeword to recover the data based on the ECP information in the ECP stored in the ECP block.

12. The method of claim 11, further comprising:
   determining, by the read module, a number of hard errors in the codeword;
   determining, by the read module, that the number of hard errors in the codeword exceeds a threshold; and
   responsive to the determination that the number of hard errors in the codeword exceeds the threshold, updating the ECP information associated with the codeword.

13. The method of claim 12, wherein the threshold is less than a number of hard errors that are correctable by the ECC process.

14. The method of claim 12, wherein the threshold is a first threshold, and wherein the method further comprises:
   determining, by the read module, that the number of hard errors in the codeword exceeds a second threshold that is higher than the first threshold; and
   retiring, by the read module, memory cells associated with the codeword from further use responsive to the determination that the number of hard errors exceeds the second threshold.

15. The method of claim 11, further comprising analyzing, by the read module, ECP information associated with a plurality of codewords of the memory to determine that the memory has a bus failure.

16. The method of claim 11, wherein the ECC process is a first ECC process, and wherein the method further comprises:
   performing, by the read module, a second ECC process on the codeword based on the ECP information;
   determining, by the read module, that the second ECC process failed; and
   performing, by the read module, a redundant array of independent silicon elements (RAISE) to decode the codeword to recover the data responsive to the determination that the second ECC process failed.

17. A system for computing, the system comprising:
   a memory to store a plurality of codewords including a first codeword;
   an error correction pointer (ECP) block to store a plurality of ECP pointers including ECP information associated with hard errors of one or more codewords assocaited with data stored in the memory; and
   a memory controller including a read module coupled to the memory and the ECP block to:
      read the first codeword from the memory;
      determine that the codeword was successfully decoded;
      determine a number of hard errors in the first codeword responsive to the determination that the codeword was successfully decoded;
      determine that the number of hard errors in the first codeword exceeds a threshold; and
      responsive to the determination that the number of hard errors in the first codeword exceeds the threshold, store error correction pointer (ECP) information associated with hard errors of the first codeword in one or more of the ECPs stored in the ECP block.

18. The system of claim 17, wherein the read module includes an error correction code (ECC) module to perform an ECC process on the first codeword, and wherein the read module is further to use the ECP information to decode the first codeword responsive to a determination that the ECC process failed.

19. The system of claim 18, wherein the threshold is less than a number of hard errors that are correctable by the ECC process.

20. The system of claim 18, wherein the ECC process is a first ECC process, wherein the ECC module is further to perform a second ECC process on the codeword decoded using the ECP information, and wherein the read module is to further use a redundant array of independent silicon elements (RAISE) to decode the codeword responsive to a determination that the second ECC process failed.

21. The system of claim 17, wherein the threshold is a first threshold, and wherein the read module is to further:
  determine that the number of hard errors in the first codeword exceeds a second threshold that is higher than the first threshold; and
  responsive to the determination that the number of hard errors exceeds the second threshold, retire memory cells of the memory associated with the first codeword from further use.

22. The system of claim 17, wherein the read module is to further determine that the memory has a bus failure based on ECP information associated with the plurality of codewords of the memory.

23. The system of claim 17, wherein the memory is a phase change memory or a cross-point memory.

24. The system of claim 17, wherein the ECP information include an identifier of the codeword identifying where the codeword is stored in the memory, or indicating bits of the codeword that include hard errors and correct values of those bits, and wherein the ECPs is arranged in a binary tree in the ECP block.

\* \* \* \* \*

UNITED STATES PATENT AND TRADEMARK OFFICE
CERTIFICATE OF CORRECTION

PATENT NO. : 9,250,990 B2
APPLICATION NO. : 14/129070
DATED : February 2, 2016
INVENTOR(S) : Ravi H. Motwani et al.

It is certified that error appears in the above-identified patent and that said Letters Patent is hereby corrected as shown below:

In the Claims

Claim 10, Column 9,
Line 41, "...include..." should read -- includes --

Claim 10, Column 9,
Line 45, "...ECPs is..." should read -- ECPs are --

Claim 17, Column 10,
Line 36, "...assocaited..." should read -- associated --

Claim 24, Column 11,
Line 17, "...include..." should read -- includes --

Claim 24, Column 11,
Line 20, "...ECPs is..." should read -- ECPs are --

Signed and Sealed this
Twenty-sixth Day of July, 2016

Michelle K. Lee
*Director of the United States Patent and Trademark Office*